United States Patent
Zhang et al.

(10) Patent No.: US 12,332,172 B1
(45) Date of Patent: Jun. 17, 2025

(54) METHOD FOR ADJUSTING LASER PATH OF TERAHERTZ NEAR-FIELD SYSTEM

(71) Applicant: Institute of Energy, Hefei Comprehensive National Science Center, Hefei (CN)

(72) Inventors: Wenbing Zhang, Hefei (CN); Hongbo Cui, Hefei (CN); Chengyao Peng, Hefei (CN); Fengting Jiang, Hefei (CN); Zhenchun Yu, Hefei (CN)

(73) Assignee: Institute of Energy, Hefei Comprehensive National Science Center, Anhui (CN)

( * ) Notice: Subject to any disclaimer, the term of this patent is extended or adjusted under 35 U.S.C. 154(b) by 0 days.

(21) Appl. No.: 19/024,749

(22) Filed: Jan. 16, 2025

(30) Foreign Application Priority Data

Jan. 19, 2024 (CN) .......................... 202410078588.6

(51) Int. Cl.
*G01N 21/3586* (2014.01)
*G01Q 20/02* (2010.01)

(52) U.S. Cl.
CPC ......... *G01N 21/3586* (2013.01); *G01Q 20/02* (2013.01)

(58) Field of Classification Search
CPC ............................ G01N 21/3586; G01Q 20/02
See application file for complete search history.

(56) References Cited

U.S. PATENT DOCUMENTS

2008/0049223 A1* 2/2008 Iyoki ...................... B82Y 35/00
356/369

FOREIGN PATENT DOCUMENTS

| CN | 1913043 A | 2/2007 |
| CN | 106950782 A | 7/2017 |
| CN | 114813623 A | 7/2022 |
| CN | 116448711 A | 7/2023 |

\* cited by examiner

*Primary Examiner* — David P Porta
*Assistant Examiner* — Fani Polyzos Boosalis
(74) *Attorney, Agent, or Firm* — Valet Patent Service Limited

(57) ABSTRACT

A method for adjusting laser path of terahertz near-field system, belonging to the field of terahertz near-field imaging. It mainly addresses the issues where an optical microscope cannot clearly observe the laser spot on the probe cantilever, and the laser path adjustment is complex, slow, and inaccurate. The method employs a three-step process: adjusting the position of laser device to roughly adjust the emitted laser, adjusting the position of laser device to fine-tune the emitted laser, and a using a spot position detector to adjust the received laser. By using the shadow magnification projection method, the position of the laser spot on the probe cantilever can be directly and effectively observed and the laser light path can be quickly adjusted. This adjustment method is fast and easy to operate.

1 Claim, 4 Drawing Sheets

METHOD FOR ADJUSTING LASER PATH OF TERAHERTZ NEAR-FIELD SYSTEM

TECHNICAL FIELD

A method for adjusting laser path of terahertz near-field system, belonging to the field of terahertz near-field system imaging, specifically relates to the displacement control of a rectangular cantilever probe in a terahertz near-field system.

BACKGROUND

The terahertz near-field imaging system is based on a near-field scanning microscope system, composed of a terahertz source, terahertz optical path, parabolic mirror, probe platform, and others. The terahertz wave is emitted by the terahertz source, passes through the terahertz optical path, and reaches the parabolic mirror, which focuses it onto the probe platform in the near-field scanning microscope. The sample is located below the probe platform, and the terahertz wave reflected by the probe carries the near-field information of the sample back to the terahertz optical path through the parabolic mirror and reaches the signal processing system of the near-field scanning microscope, realizing the high-resolution imaging function of the terahertz near-field. Its imaging accuracy is generally at the nanometer level, ranging from tens of nanometers to a few nanometers.

The surface imaging principle in the terahertz near-field system involves detecting the micro-displacement control of the cantilever probe. By using a laser to illuminate the tip of the cantilever, the spot position detector, which is a quadrant detector, can detect the deflection of the probe cantilever. An electronic feedback system is used to maintain a constant amount of bending, thereby controlling the Z-axis of the scanning tube to keep the force between the probe tip and the sample constant. During scanning, the surface morphology of the sample can be obtained by recording the feedback signal. The laser emitted by the laser device is reflected by the probe cantilever to the light spot position detector, which is also the first step of imaging and requires laser path adjustment. The probe cantilever used in the terahertz near-field system is generally rectangular, with a width on the order of 50 micrometers and a length on the order of 200 micrometers. The structure at the tip of the probe is small, requiring observation of the red laser spot on the back of the probe cantilever under an optical microscope to find the point of maximum light intensity, and then moving the point of maximum light intensity of the laser spot to the tip of the probe. However, due to reasons such as unevenness, reflection, and material of the back of the probe, it is often difficult to clearly observe the laser spot on the probe cantilever through the microscope. In such cases, the current method is to first adjust the laser spot to the 2-millimeter-wide substrate at the root of the probe, observe the laser reflection on the light spot detector with the naked eye, and then move the laser spot onto the probe cantilever. Direct and effective observation is not possible; instead, it is determined by the values from the light spot detector and the position of the red dot in the laser spot window in the control software. However, there is a certain degree of inaccuracy. When the laser does not reflect off the probe cantilever and instead reflects off another position, it may still be possible to achieve functionality, but it directly leads to probe damage during operation. Since direct and effective observation is not possible, a certain level of experience and patience is required, making the adjustment of the laser path very complex and slow.

SUMMARY

The content of this application utilizes the shadow magnification projection method, which allows for direct observation and determination of the laser spot's position on the probe cantilever, making the laser path adjustment quick and easy to operate.

To address the issue where the microscope cannot clearly observe the laser spot on the probe cantilever, and the laser path adjustment is complex, slow, and inaccurate, this application utilizes the shadow magnification projection method during the laser path adjustment. This method targets the difficulty of directly observing the laser spot on the probe cantilever through the microscope. By observing the magnified shadow of the light spot on a plane more than 5 centimeters below the probe, the shadow of the probe tip is positioned in the center of the laser spot, allowing for direct observation and determination of the laser spot's position on the probe cantilever.

The technical solution adopted by the present application to solve its technical problem is as follows: First, adjusting the laser emitted by the laser device to the vicinity of the probe, adjusting a position adjustment knob of the laser device, and observing through an optical microscope so that the laser is located on a substrate with a width of 2 millimeters at the root of the probe. Adjusting the position adjustment knob of the laser device, so that the spot on the substrate is located at the root center of the probe, adjusting the position adjustment knob of the laser device to move the laser toward the probe cantilever. Observing the laser spot under the projection magnification method, observing the magnified shadow of the laser spot on a position plane more than 5 cm away from the lower end of the probe. Observing the magnified shadow of the spot and adjusting the position adjustment knob of the laser device so that the shadow of the probe tip is in the middle of the laser spot and can be clearly observed. Then adjusting the position knob of the spot detector, observing the value of the spot detector and the position of the red dot in the laser spot window in the control software, so that the spot detector value is maximized and the red dot in the laser spot window is in the center. In this way, the laser spot is maximized and located in the middle of the spot detector, and the laser optical path adjustment is completed.

The specific technical scheme of the present application is as follows:

A method for adjusting laser path of terahertz near-field system, the position of the laser spot on a probe cantilever can be directly observed and determined by the shadow magnification projection method, and the laser optical path can be quickly adjusted, characterized in that the method comprises the following steps:

step 1, adjusting the position of laser device to roughly adjust the emitted laser;

step 2, adjusting the position of laser device to fine-tune the emitted laser;

step 3, using a spot position detector to adjust the received laser.

This application has the following beneficial technical effects:

The advantage of this application is the ability to quickly and accurately adjust the laser path, solving the problem where the microscope cannot clearly observe the laser spot on the probe cantilever, and addressing the complexity, slowness, and inaccuracy of laser path adjustment. The adjustment time is generally within ten minutes, with the fastest being 2-3 minutes. This operational method is characterized by its speed and ease of use.

DETAILED DESCRIPTION

The following further explains the present application in conjunction with the accompanying drawings and embodiments.

A method for adjusting laser path of terahertz near-field system, wherein the position of the laser spot on a probe cantilever can be directly observed and determined by the shadow magnification projection method. This solves the problem that the microscope cannot clearly observe the probe cantilever laser spot and quickly adjusts the laser light path. The laser path is the path where the laser emitted by the laser device is reflected by the probe cantilever to the spot position detector. Since the probe moves during operation, the probe is generally fixed, and adjustments are made to the laser device and the spot position detector to ensure that the maximum amount of emitted laser is reflected into the spot detector.

Figure 1:
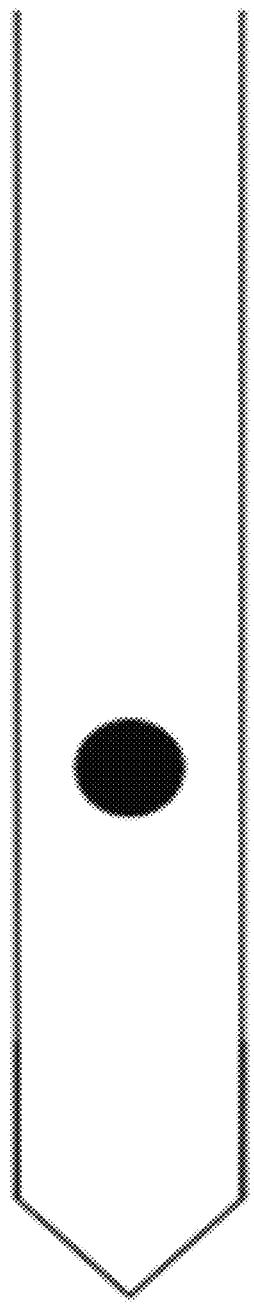
FIG. 1 is a schematic diagram of the probe and the point of maximum light intensity of the spot observed through a microscope.

The method for adjusting laser path of terahertz near-field system in this application specifically comprises the following steps, Step 1, adjusting the position of laser device to roughly adjust the emitted laser, wherein observing with naked eyes the laser emitted by the laser device to the vicinity of the probe, adjusting a position adjustment knob of the laser device, and observing through an optical microscope so that the laser is located on a substrate with a width of 2 millimeters at the root of the probe; observing the laser spot at the root through the optical microscope, adjusting the position adjustment knob of the laser device, so that the spot on the substrate is located at the root center of the probe, then adjusting the position adjustment knob of the laser device to move the laser toward the probe cantilever, and observing through the optical microscope whether the maximum light intensity point of the laser spot is at the center of the probe, wherein the center is shown in the FIG. 1. However, due to various reasons such as unevenness, reflection, and material of the back of the probe, it is difficult to clearly observe the maximum point of the laser spot on the probe cantilever through an optical microscope, and it is difficult to ensure that it is in the center of the probe.

Figure 2:
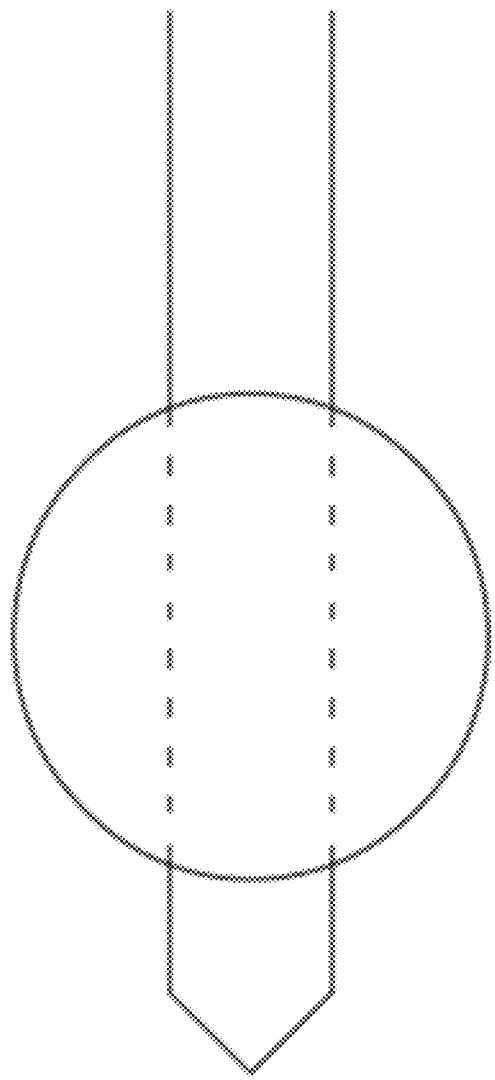
FIG. 2 is a schematic diagram of the probe and the spot observed under the projection magnification method.
Figure 3:
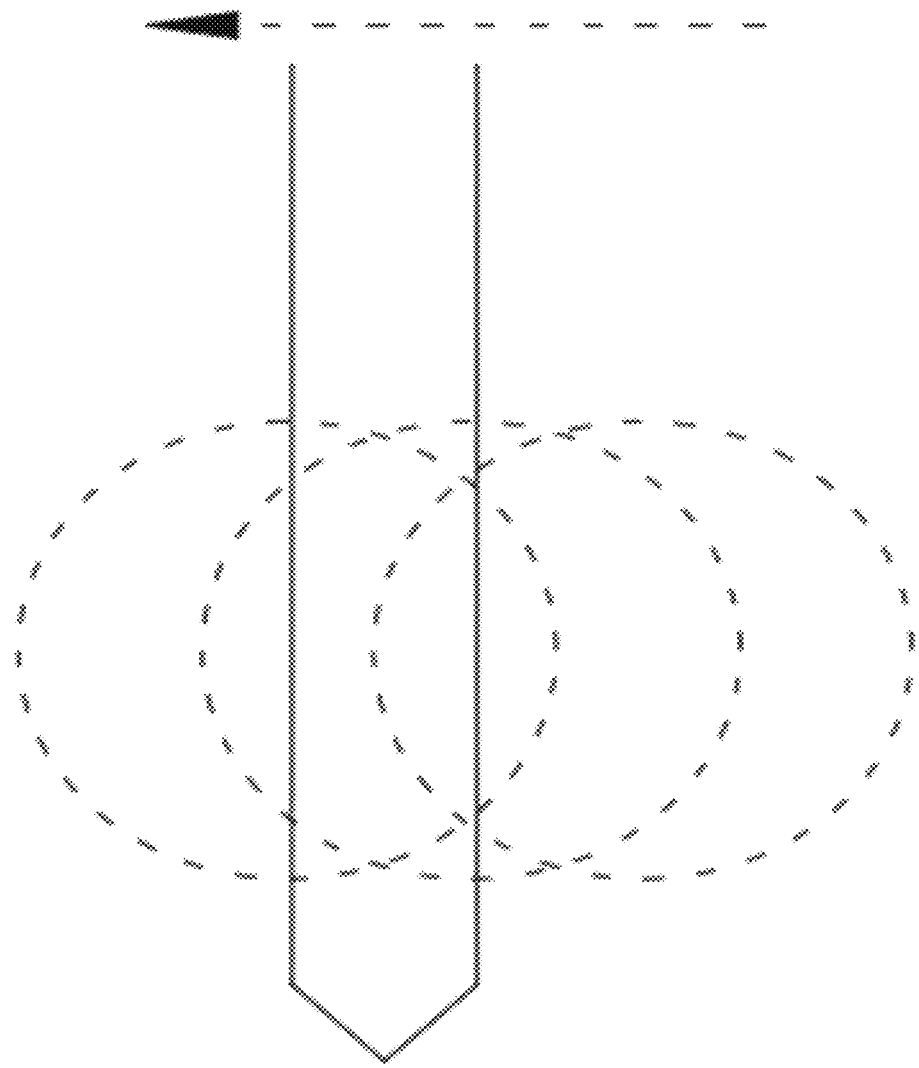
FIG. 3 is a schematic diagram of the adjustment of the probe and spot position under the projection magnification method.
Figure 4:
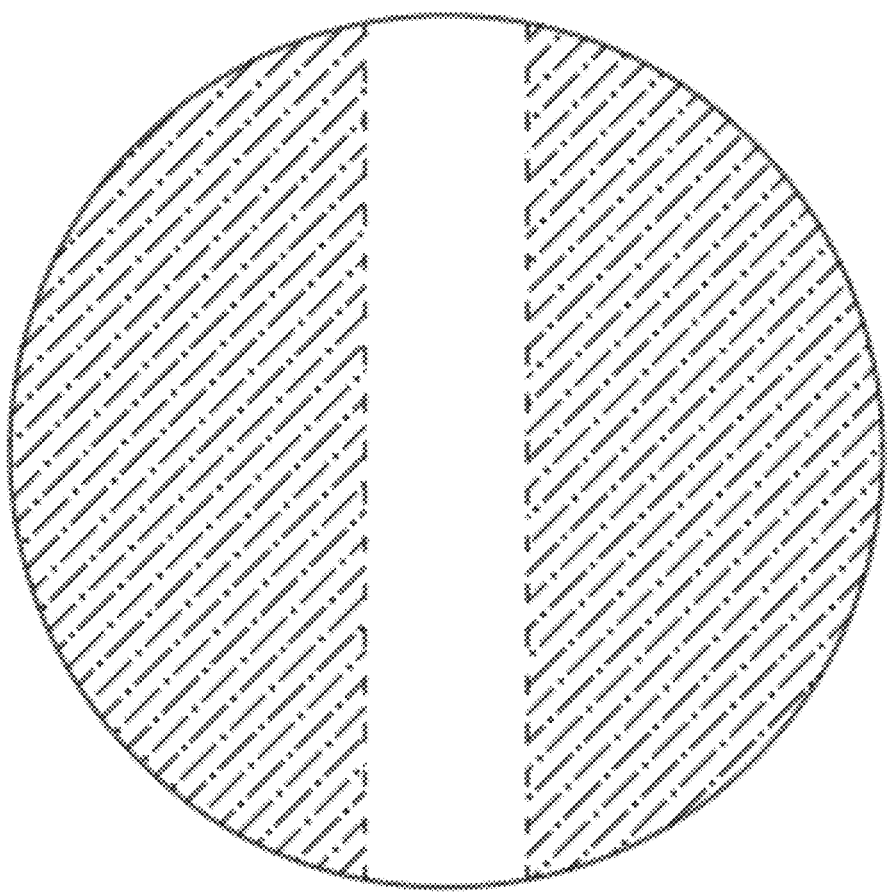
FIG. 4 is a schematic diagram of the shadow of the probe and spot under the projection magnification method.

Step 2, adjusting the position of laser device to fine-tune the emitted laser, wherein observing the laser spot under the projection magnification method, and observing the magnified shadow of the laser spot on a position plane more than 5 cm away from the lower end of the probe, the shadow magnification method is to use the laser to the 100-micron spot on the probe, magnify it on a 5-cm position plane, magnify the shadow of the spot by 30-50 times to form a 3-5 mm spot, and clearly observe the relative position of the spot and the probe. The laser spot adjusted by step 1 is located near the probe. Observing under the projection magnification method, the schematic diagram of the adjusted spot and probe is shown in FIG. 2, and the probe is located at the center of the spot, where the center of the spot is the point with the maximum light intensity. In fact, the spot is often not in the center of the probe. As shown in FIG. 3, the spot is near the probe, fine-tune the position adjustment knob of the laser device to move the spot toward the probe, and observe the projection of the spot and the probe on the plane 5 cm below the probe, as shown in FIG. 4, the shadow part blocked by the probe is located at the center of the spot, so that the maximum light intensity point of the spot is already at the center of the back of the probe.

Step 3, using a spot position detector to adjust the received laser, wherein observing with the naked eye the laser reflected by the probe reaching the spot position detector. If it is not on the spot position detector, adjusting the fixing screws of the spot position detector to move the laser into the spot position detector. Using control software to observe the SUM value displayed by the spot detector and the position of the red dot in the laser spot window, adjusting the position knob of the spot detector to maximize the SUM value of the spot detector and position the red dot in the laser spot window at the center of the window, so that the laser spot is maximized and located in the middle of the spot detector, and the laser optical path adjustment is completed.

A method for adjusting laser path of terahertz near-field system, primarily addressing the issues where an optical microscope cannot clearly observe the laser spot on the probe cantilever, and the laser path adjustment is complex, slow, and inaccurate. By using the shadow magnification projection method, the position of the laser spot on the probe cantilever can be directly and effectively observed and determined, allowing for quick adjustment of the laser path. This operational method is characterized by its speed and ease of use.

It is easily understood by those skilled in the art that the above description is merely a preferred embodiment of the present application and is not intended to limit the invention. Any modifications, equivalent replacements, and improvements made within the spirit and principles of the present application should be included within the scope of protection of the present application.

What is claimed is:

1. A method for adjusting laser path of terahertz near-field system, wherein the position of a laser spot on a probe cantilever can be directly observed and determined by the shadow magnification projection method, and the laser optical path can be quickly adjusted, characterized in that the method comprises the following steps:

step 1, adjusting the position of laser device to roughly adjust the emitted laser;

step 2, adjusting the position of laser device to fine-tune the emitted laser;

step 3, using a spot position detector to adjust the received laser;

wherein a specific implementation method of step 1 is that: observing with naked eyes the laser emitted by the laser device to the vicinity of the probe, adjusting a position adjustment knob of the laser device, and observing through an optical microscope so that the laser is located on a substrate with a width of 2 millimeters at a root of the probe; observing the laser spot at the root through the optical microscope, adjusting the position adjustment knob of the laser device, so that the spot on the substrate is located at the root center of the probe, then adjusting the position adjustment knob of the laser device to move the laser toward the probe cantilever, and observing through the optical microscope whether the maximum light intensity point of the laser spot is at the center of the probe;

wherein a specific implementation method of step 2 is that: observing the laser spot under the projection magnification method, observing the magnified shadow of the laser spot on a position plane more than 5 cm away from the lower end of the probe, the shadow magnification method is to use the laser to the 100-micron spot on the probe, magnify it on a 5-cm position plane, magnify the shadow of the spot by 30-50 times to form a 3-5 mm spot, and clearly observe the relative position of the spot and the probe, the laser spot adjusted by step 1 is located near the probe, and when observe under the projection magnification method, the adjusted spot and the probe are located at the center of the spot, where the center of the spot is the point with the maximum light intensity; if the spot is not in the center of the probe, but near the probe, fine-tune the position adjustment knob of the laser device to move the spot toward the probe, and observe the projection of the spot and the probe on the plane 5 cm below the probe, the shadow part blocked by the probe is located at the center of the spot, so that the maximum light intensity point of the spot is already at the center of the back of the probe;

wherein the specific implementation method of step 3 is that: observing with the naked eye the laser reflected by the probe reaching the spot position detector, and observing, so that a SUM value of the spot detector is maximized, and a red dot position in a laser spot window is in the center of the window.

\* \* \* \* \*